United States Patent
Fortenbery et al.

[11] Patent Number: 6,050,390
[45] Date of Patent: Apr. 18, 2000

[54] CHUTE FOR A TILT TRAY SORTER

[75] Inventors: J. David Fortenbery, Charlotte; David Erceg, Concord; Leroy A. Winkler, III, Stanley; Charles H. Lee, Kannapolis, all of N.C.

[73] Assignee: Mantissa Corporation, Charlotte, N.C.

[21] Appl. No.: 08/907,036

[22] Filed: Aug. 6, 1997

Related U.S. Application Data

[63] Continuation-in-part of application No. 08/632,012, Apr. 15, 1996, Pat. No. 5,836,436.

[51] Int. Cl.[7] ..................................................... B65G 47/46
[52] U.S. Cl. ........................... 198/370.03; 193/4; 193/33
[58] Field of Search .................... 198/370.03, 370.04; 193/2 R, 4, 7, 33; 209/900

[56] References Cited

U.S. PATENT DOCUMENTS

| | | | |
|---|---|---|---|
| 3,147,845 | 9/1964 | Harrison et al. | 198/370.04 |
| 3,684,072 | 8/1972 | Castrellon | 193/7 |
| 4,413,721 | 11/1983 | Bollier | 198/370.03 |
| 4,729,466 | 3/1988 | Bollier et al. | 198/370.03 |
| 4,744,454 | 5/1988 | Polling | 198/365 |
| 5,054,601 | 10/1991 | Sjogren et al. | 198/365 |
| 5,086,905 | 2/1992 | Polling | 198/365 |
| 5,836,436 | 11/1998 | Fortenbery et al. | 198/370.03 |

FOREIGN PATENT DOCUMENTS

WO 90/09944   9/1990   WIPO .

*Primary Examiner*—Joseph E. Valenza
*Attorney, Agent, or Firm*—Rhodes & Mason, PLLC

[57] ABSTRACT

A package sorting conveyor system having at least one conveyor cart movable along a continuous track and at least one unloading station. The conveyor system includes a two-axis tiltable support apparatus for supporting the carrying tray on the conveyor cart and for allowing tilting of the carrying tray towards at least one side of the package sorting conveyor to unload a package into unloading stations on at least one side of the sorting conveyor. A transition zone funnel upstream of the unloading station receives the package from the conveyor cart. The transition zone funnel includes an inlet adjacent to the continuous track conveyor system at the unloading station for receiving the package discharged from the tiltable conveyor cart; an upwardly inclined downstream wall located downstream of the inlet for preventing the package from tipping over; and an outlet located downstream from the upwardly inclined downstream wall for discharging the package from the funnel. In the preferred embodiment, a secondary downstream chute is located downstream from the transition zone funnel for conveying the discharged package to its final destination.

62 Claims, 8 Drawing Sheets

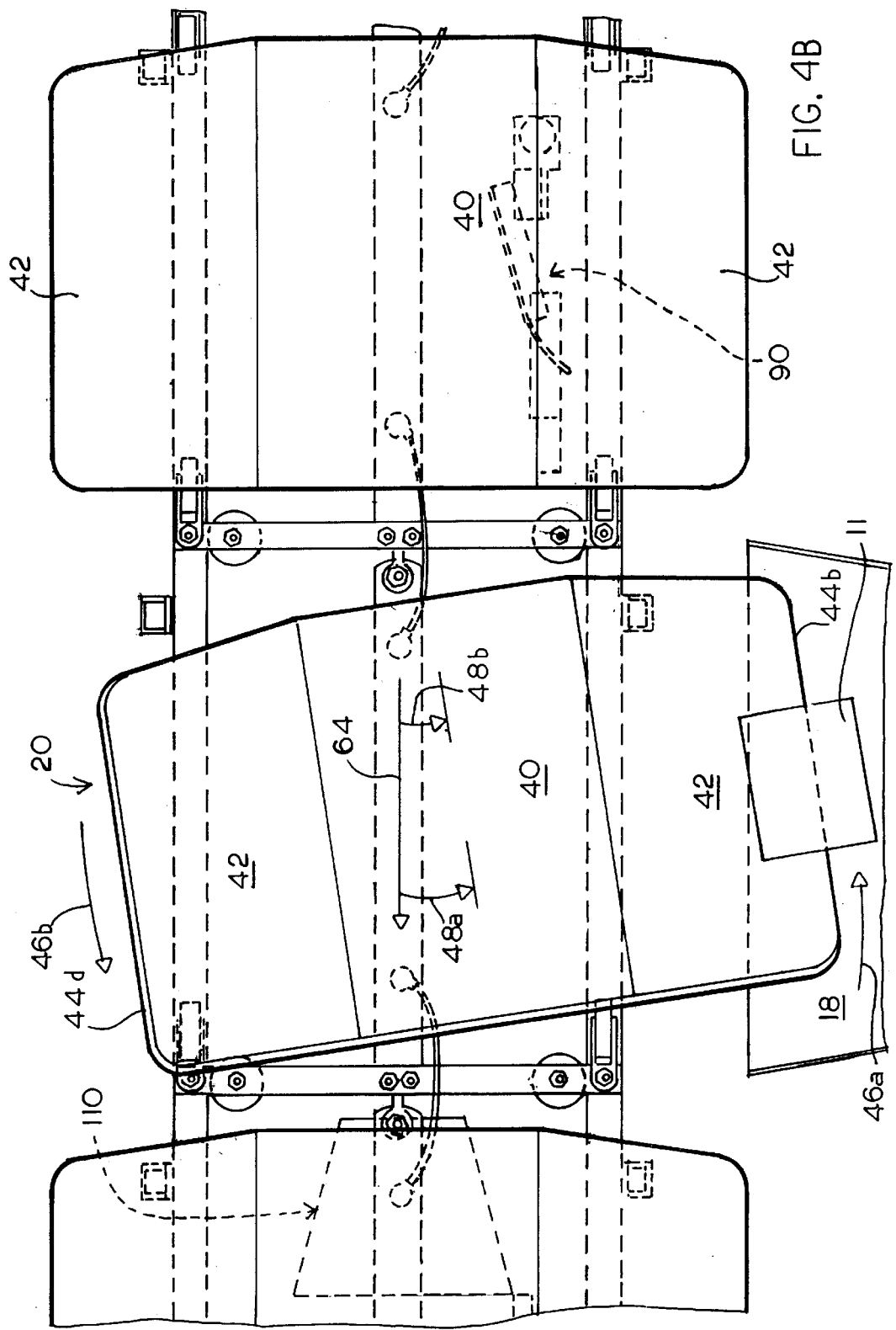

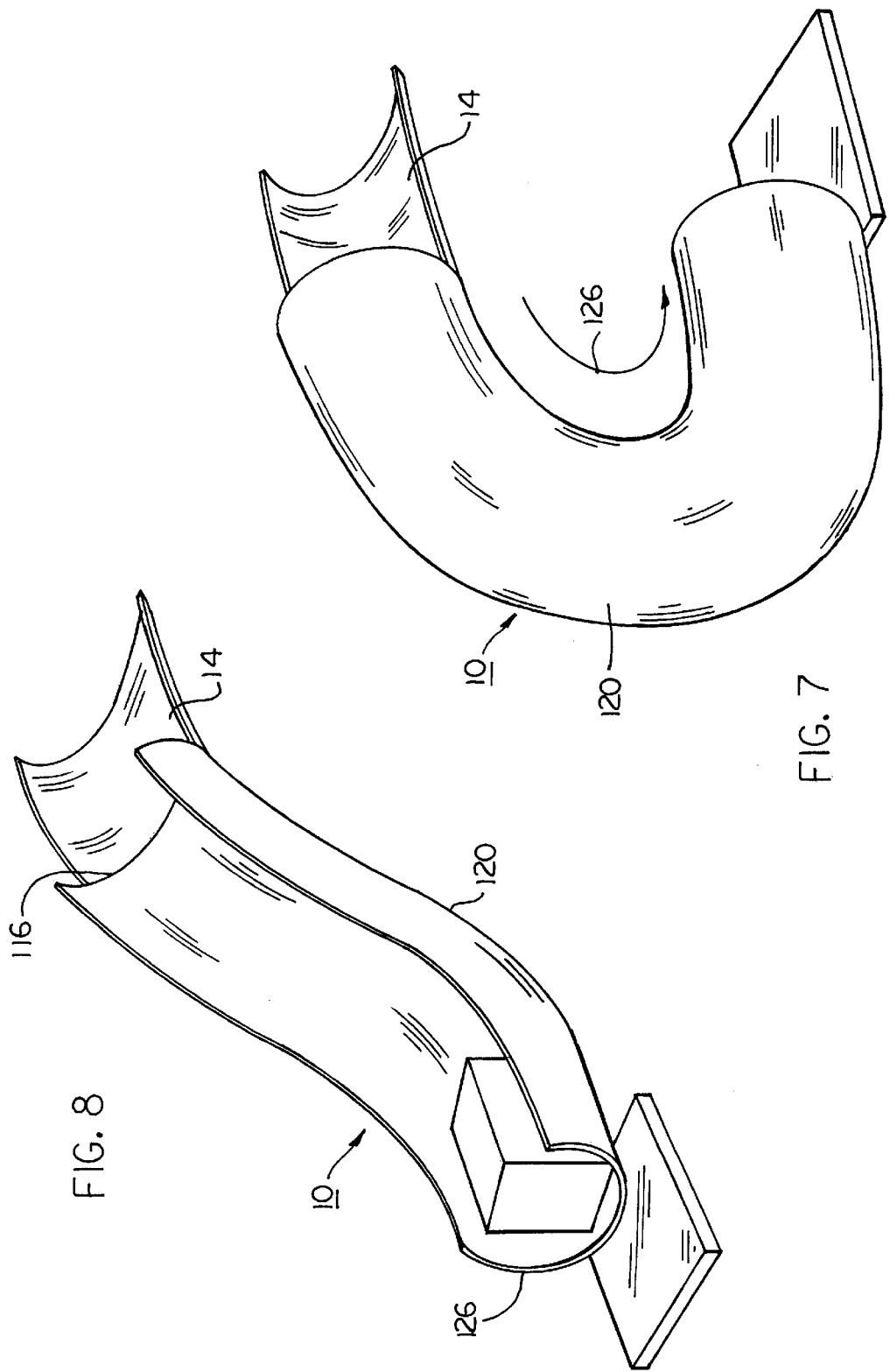

CHUTE FOR A TILT TRAY SORTER

CROSS-REFERENCE TO RELATED APPLICATIONS

The present application is a Continuation-in-Part of U.S. application Ser. No. 08/632,012, filed Apr. 15, 1996, now U.S. Pat. No. 5,836,436, issued Nov. 17, 1998.

BACKGROUND OF THE INVENTION (1) Field of the Invention

The present invention relates generally to package sorting conveyors and, more particularly, to a conveyor system having a tiltable support, a transition zone funnel, and a secondary downstream chute.

(2) Description of the Prior Art

Conveyor systems having a number of individual carrying carts have been used for many years to carry and sort the packages or other items, such as mail. Conventional tilt tray sorters discharge their goods onto individual chutes located near each packer. For example, U.S. Pat. No. 5,054,601 to Sjogren et al. discloses a package sorting conveyor comprised of a train of tilt tray carriers coupled in tandem to form a continuous loop. Each carrier includes a pivotally mounted tilt tray normally maintained in an upright position. The carriers are moved around the loop by a series of motors spaced around the loop. Branching out from the loop are out-feed chutes or the like for receiving packages from the carriers. When a particular carrier holding a particular package to be sorted reaches a selected out-feed chute, an actuator tilts the tray to dump the package into the out-feed chute.

Another example of a similar package sorting conveyor is disclosed in International PCT Application No. PCT/DK90/00047 of Kosan Crisplant A/S.

One significant disadvantage of most conventionally designed package sorting conveyors is that the conveyor carriers laterally tilts only on a horizontal axis parallel to the direction of conveyor travel. While this accomplishes the objective of dumping the package from the carrier into an out-feed chute or the like, the package is often roughly tumbled or rolled, sometimes damaging the package's contents. One reason for this is that the package typically is unloaded from the carrier while still traveling forward at the same speed as the conveyor. Thus, packages tend to slam into a forward retaining wall of the out-feed chute before sliding down the chute.

Another problem with most conventional horizontally tilting conveyors is that because the package is moving forward at full speed when they are unloaded into the out-feed chute, the out-feed chute must be relatively wide so that the package does not miss the chute and fall off the conveyor past the chute. This often unnecessarily decreases the number and location of the discharge chutes of the conveyor system.

U.S. Pat. Nos. 4,744,454 and 5,086,905, both to Pölling, disclose previous attempts to remedy this problem of rough handling by conventional laterally tilting conveyor carriers. Both of these patents to Pölling disclose a conveyor element for a package conveyor that includes a tilting carrier tray mounted to be rotatably about two swivel axis. A first swivel shaft extends obliquely downward from the under side of the carrying tray and is in turn connected at an angle to the end of a second swivel shaft extending obliquely upwards from a base support part of the conveyor element. Together, the two swivel shafts form a "V" that points in the direction of the conveyor travel. Both of the swivel shafts lie in the vertical plain of symmetry of the conveyor element when the carrier tray is disposed in its upright position.

Because the carrier tray of Pölling rotates about two oblique axis, the carrier tray tilts not only on a horizontal axis, but is moved through a geometrically complex spatial reorientation during package discharge. This allows for more gentle placement of a package on an out-feed chute than can be accomplished using conventional conveyor trays that laterally tip only on a horizontal axis because the Pölling conveyor element imparts some degree of rearward velocity to the package as it is discharged, which, when added to the forward velocity of the conveyor system, results in the package's forward velocity during discharge being lessened.

However, the conveyor elements of both of Pölling's patents are unduly complicated. In fact, the second Pölling patent was directed towards simplifying the original design disclosed in the first Pölling patent which was expensive and complicated to manufacture efficiently. As a result of this complexity and cost, the Pölling devices have not enjoyed significant commercial acceptance and success. In addition, there is no provision in Pölling to take advantage of the tilting movement of the tray to allow the direction of the discharged package to be further controlled.

Thus, there remains a need for a new and improved tilt tray system which provides two-axis tilting and discharge while, at the same time, further controls the direction of the discharged package to permit the package to be placed at whatever location is desired.

SUMMARY OF THE INVENTION

The present invention is directed to a package sorting conveyor system having at least one conveyor cart movable along a continuous track and at least one unloading station. The conveyor system includes a two-axis tiltable support apparatus for supporting the carrying tray on the conveyor cart and for allowing tilting of the carrying tray towards at least one side of the package sorting conveyor to unload a package into unloading stations on at least one side of the sorting conveyor.

In the preferred embodiment, the tiltable support apparatus includes an upper support structure joined to the carrying tray; a lower support structure mounted atop a frame structure of the conveyor cart; and an angled pivot structure pivotally connecting the upper support structure to the lower support structure along a pivot axis. The pivot axis is disposed at an angle to a line of travel of the sorting conveyor so as to impart two axial components to the tilting of the carrying tray.

A transition zone funnel upstream of the unloading station receives the package from the conveyor cart. The transition zone funnel includes an inlet adjacent to the continuous track conveyor system at the unloading station for receiving the package discharged from the tiltable conveyor cart; an upwardly inclined downstream wall located downstream of the inlet for preventing the package from tipping over; and an outlet located downstream from the upwardly inclined downstream wall for discharging the package from the funnel.

In the preferred embodiment, a secondary downstream chute is located downstream from the transition zone funnel for conveying the discharged package to its final destination.

Accordingly, one aspect of the present invention is to provide a package sorting conveyor system having at least one conveyor cart movable along a continuous track and at least one unloading station. The conveyor system includes: (a) a two-axis tiltable support apparatus for supporting the carrying tray on the conveyor cart and for allowing tilting of the carrying tray towards at least one side of the package sorting conveyor to unload a package into unloading stations on at least one side of the sorting conveyor, the tiltable support apparatus including: (i) an upper support structure joined to the carrying tray; (ii) a lower support structure mounted atop a frame structure of the conveyor cart; (iii) an angled pivot structure pivotally connecting the upper support structure to the lower support structure along a pivot axis, wherein the pivot axis is disposed at an angle to a line of travel of the sorting conveyor so as to impart two axial components to the tilting of the carrying tray; and (b) a transition zone funnel upstream of the unloading station to receive the package from the conveyor cart, the transition zone funnel including: (i) an inlet adapted to receive the objects from the conveyor cart; (ii) an upwardly inclined downstream wall; and (iii) an outlet upstream of the unloading station.

Another aspect of the present invention is to provide a transition zone funnel for receiving a package discharged from a tiltable conveyor cart movable on a continuous track conveyor system at an unloading station, The funnel includes: (a) an inlet adjacent to the continuous track conveyor system at the unloading station for receiving the package discharged from the tiltable conveyor cart; (b) an upwardly inclined downstream wall located downstream of the inlet for preventing the package from tipping over; and (c) an outlet located downstream from the upwardly inclined downstream wall for discharging the package from the funnel.

Still another aspect of the present invention is to provide a package sorting conveyor system having at least one conveyor cart movable along a continuous track and at least one unloading station. The conveyor system includes: (a) a two-axis tiltable support apparatus for supporting the carrying tray on the conveyor cart and for allowing tilting of the carrying tray towards at least one side of the package sorting conveyor to unload a package into unloading stations on at least one side of the sorting conveyor, the tiltable support apparatus including: (i) an upper support structure joined to the carrying tray; (ii) a lower support structure mounted atop a frame structure of the conveyor cart; (iii) an angled pivot structure pivotally connecting the upper support structure to the lower support structure along a pivot axis, wherein the pivot axis is disposed at an angle to a line of travel of the sorting conveyor so as to impart two axial components to the tilting of the carrying tray; (b) a transition zone funnel upstream of the unloading station to receive the package from the conveyor cart, the transition zone funnel including: (i) an inlet adjacent to the continuous track conveyor system at the unloading station for receiving the package discharged from the tiltable conveyor cart; (ii) an upwardly inclined downstream wall located downstream of the inlet for preventing the package from tipping over; and (iii) an outlet located downstream from the upwardly inclined downstream wall for discharging the package from the funnel; and (c) a secondary downstream chute located downstream from the transition zone funnel for conveying the discharged package to its final destination.

These and other aspects of the present invention will become apparent to those skilled in the art after a reading of the following description of the preferred embodiment when considered with the drawings.

BRIEF DESCRIPTION OF THE DRAWINGS

FIG. 4B shows the train of carts of FIG. 4A with one of the carts in its tilted position and unloading a package onto the transition zone funnel;

FIG. 7 is a side perspective view of the secondary downstream chute having a curved central section; and FIG. 8 is a side perspective view of the secondary downstream chute having a central section that is substantially J-shaped.

DESCRIPTION OF THE PREFERRED EMBODIMENTS

Figure 1:
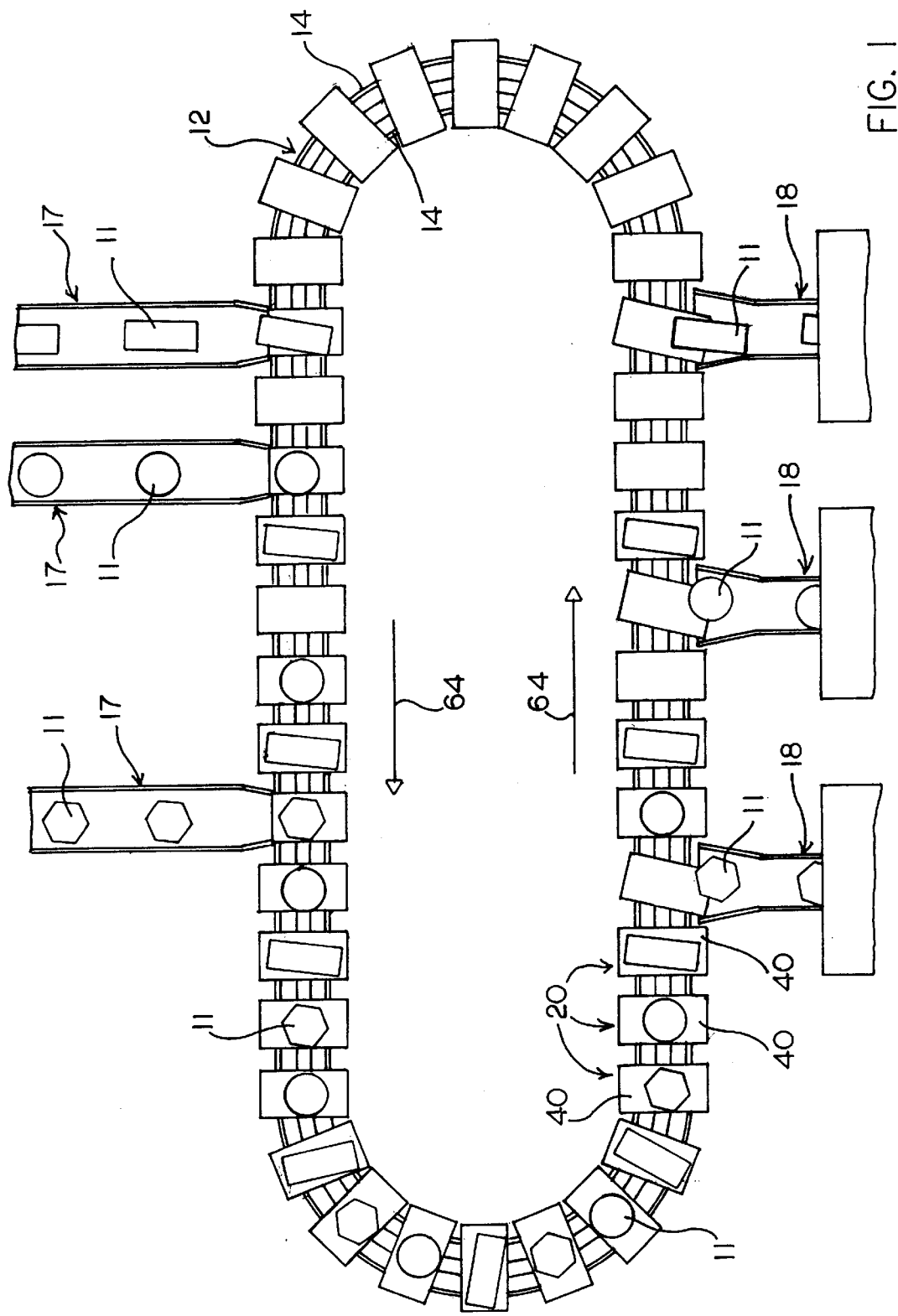
FIG. 1 is a schematic diagram illustrating a package sorting conveyor constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a sorting conveyor, generally designated 10, is shown constructed according to the present invention for transporting and sorting a package 11 or other object. The sorting conveyor 10 includes a train of individual carts 20, connected end to end, which preferably form an endless loop around a closed conveyor track 12.

Figure 2:
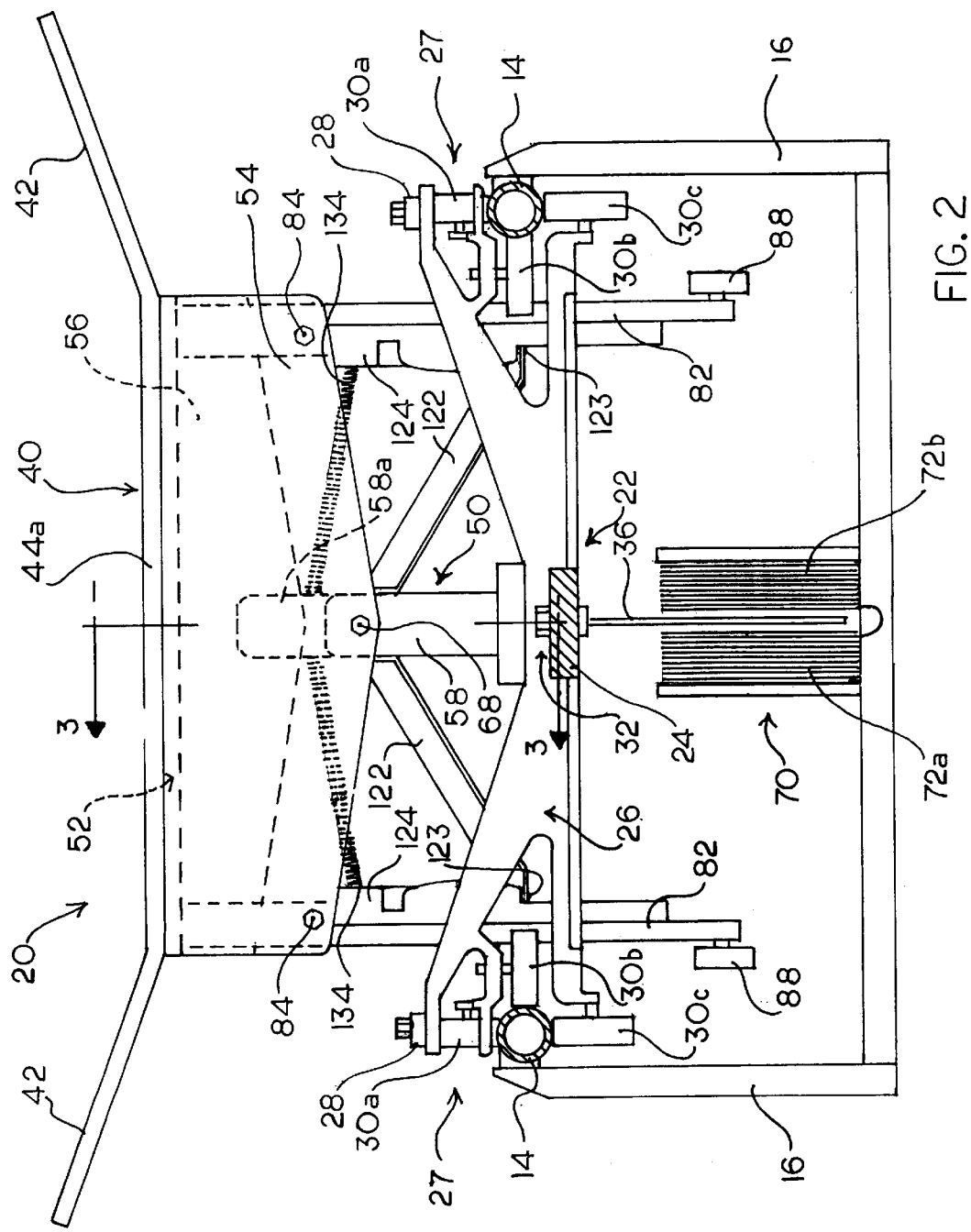
FIG. 2 is a front, elevational view of a single tilting conveyor cart of the package sorting conveyor and the power source of the conveyor.

As best shown in FIG. 2, each cart 20 includes three major sub-assemblies: a trailer frame structure 22, a generally horizontally disposed carrying tray 40 for holding the package 11 and a tiltable support apparatus 50.

Each cart 20 is built around a base trailer frame structure 22 to which other components of each cart 20 are mounted. Mounted atop the trailer frame structure 22 of each conveyor cart 20 is the tiltable support apparatus 50, which supports the carrying tray 40 thereabove. The tiltable support 50 supports the carrying tray 40 above the trailer frame structure 22 and allows tilting of the carrying tray 40 toward either side of the sorting conveyor 10 to unload a package into one of the unloading stations. Further details and operation of the two-axis tilt tray are set forth in the parent application, the entire disclosure of which is hereby incorporated by reference.

Figure 3:
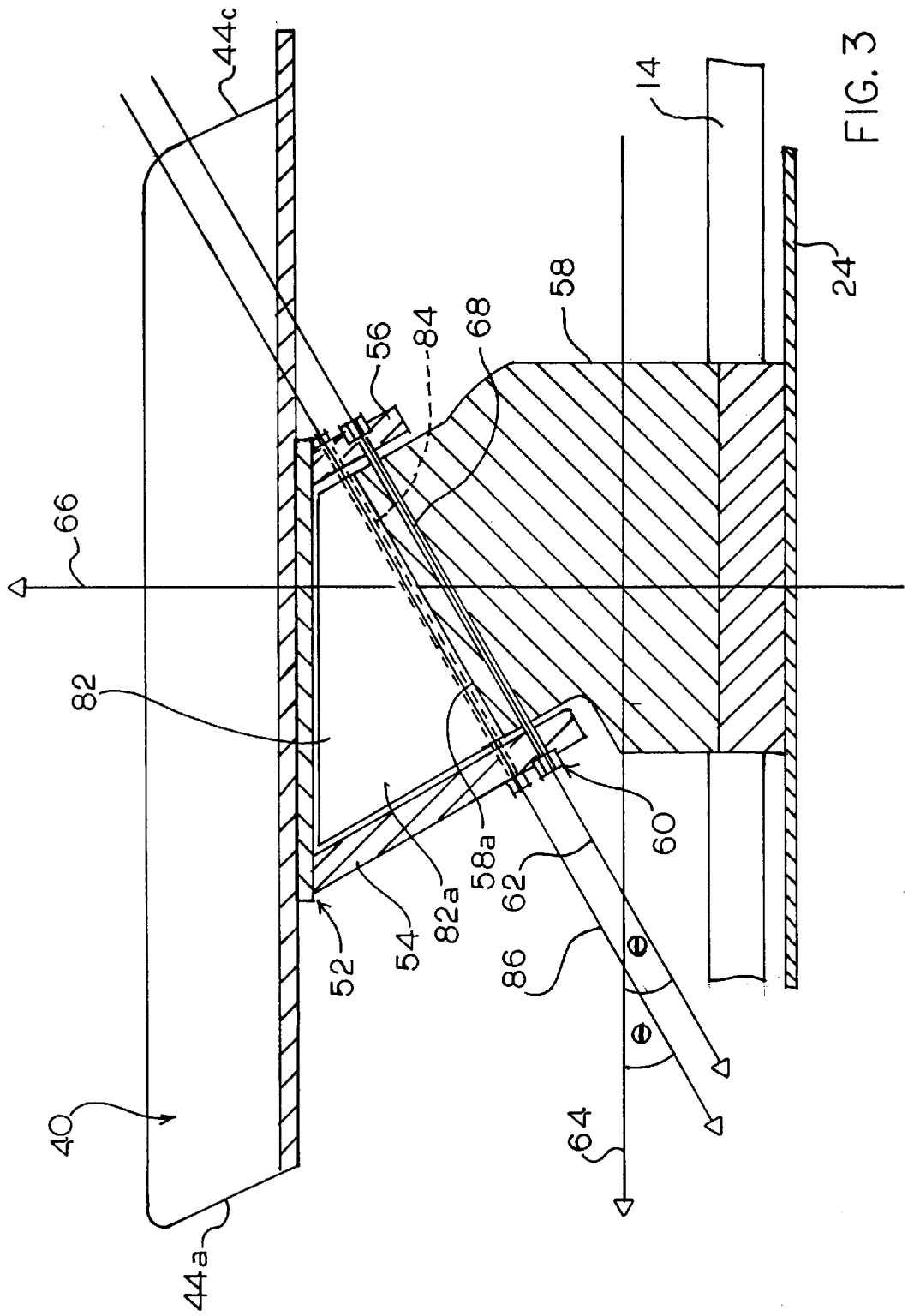
FIG. 3 is a sectional side view of a tilting conveyor cart, taken along lines 3—3 of FIG. 2, which shows the tiltable support apparatus and the angled pivot structure of the tilting conveyor cart.

As best seen in FIG. 3, the tiltable support apparatus 50 generally includes three components: an upper support structure 52 joined to a bottom surface of the carrying tray 40, a lower support structure 58 centrally mounted atop the longitudinal base member 24, and an angled pivot structure 60 pivotally connecting the lower support structure 58 to the upper support structure 52 along a pivot axis 62.

In turn, the upper support structure 52 includes a front support member 54 and a back support member 56. The lower support structure 58 is preferably, generally planar, lying in the vertical plain parallel to the conveyor line of travel 64, and includes an angled upper edge 58A. The pivot structure 60 preferably includes an axle 68 that runs either through or along the upper edge 58A of the lower support structure 58 and is connected to the front and back support members 56, 58 respectively. Preferably, the axle runs through lower regions of the front and back support members 56, 58.

As can be seen, the front support member 54 depends further down from the carrying tray 40 then the back support member 56. While the lower support 58 is rigidly fixed to the trailer frame 22, the axle 68 allows the upper support structure 52 to pivot along the pivot axis 62 of the pivot structure 60.

In an alternate embodiment of the tiltable support apparatus [not shown], the upper support structure 52 could also include, similar to the lower support structure 58, a generally planar member that lies in the vertical plain parallel to the conveyor line of travel 64. In this case, the angled pivot structure 60 could take on the form of a hinge structure joined together the two generally planar support structures 52, 58.

The pivot axis 62 lies in a vertical plain parallel to the conveyor line of travel, which is shown in the drawings as horizontal line 64. However, unlike conventional sorter conveyor tilting carts, the pivot axis 62 of the conveyor cart 20 of the invention is disposed at an angle θ to the conveyor line of travel 64 so as to impart two axial components to the tilting of the carrying tray 40. Preferably, the pivot axis 62 angles downwardly at an angle of approximately 20–45 degrees below horizontal in a forward direction. In the embodiment disclosed, the pivot axis 62 is angled downwardly 30 degrees. The pivot axis 62 preferably intersects a plain occupied by the carrying tray 40 rearward of the center of the tray 40.

By disposing the pivot axis 62 in a downwardly directed angle θ instead of parallel to the conveyor line of travel 64, two axial components are imparted to the tilting motion of the carrying tray 40. The first axial component of the trays' tilting motion is lateral tipping on a horizontal axis parallel to the conveyor line of travel 64. The second axial component of the trays tilting motion is rotating around a vertical axis 66 perpendicular to the conveyor line of travel. Thus, while the tray only tilts along a single, angled pivot axis 62, the overall motion of the tray 40 as it tilts includes two axial components.

Figure 4A:
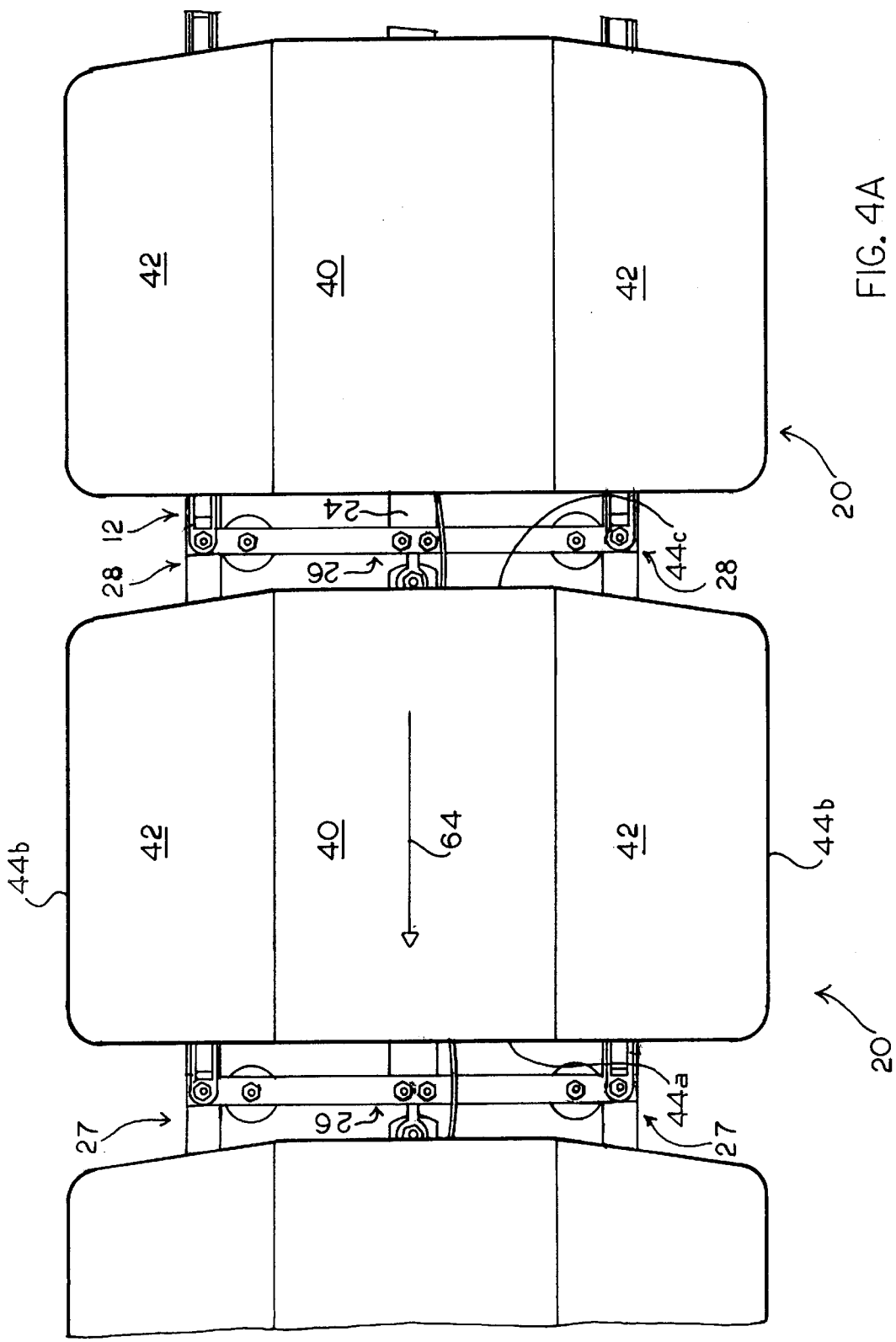
FIG. 4A is a top view of a train of carts of the package sorting conveyor.
Figure 5:
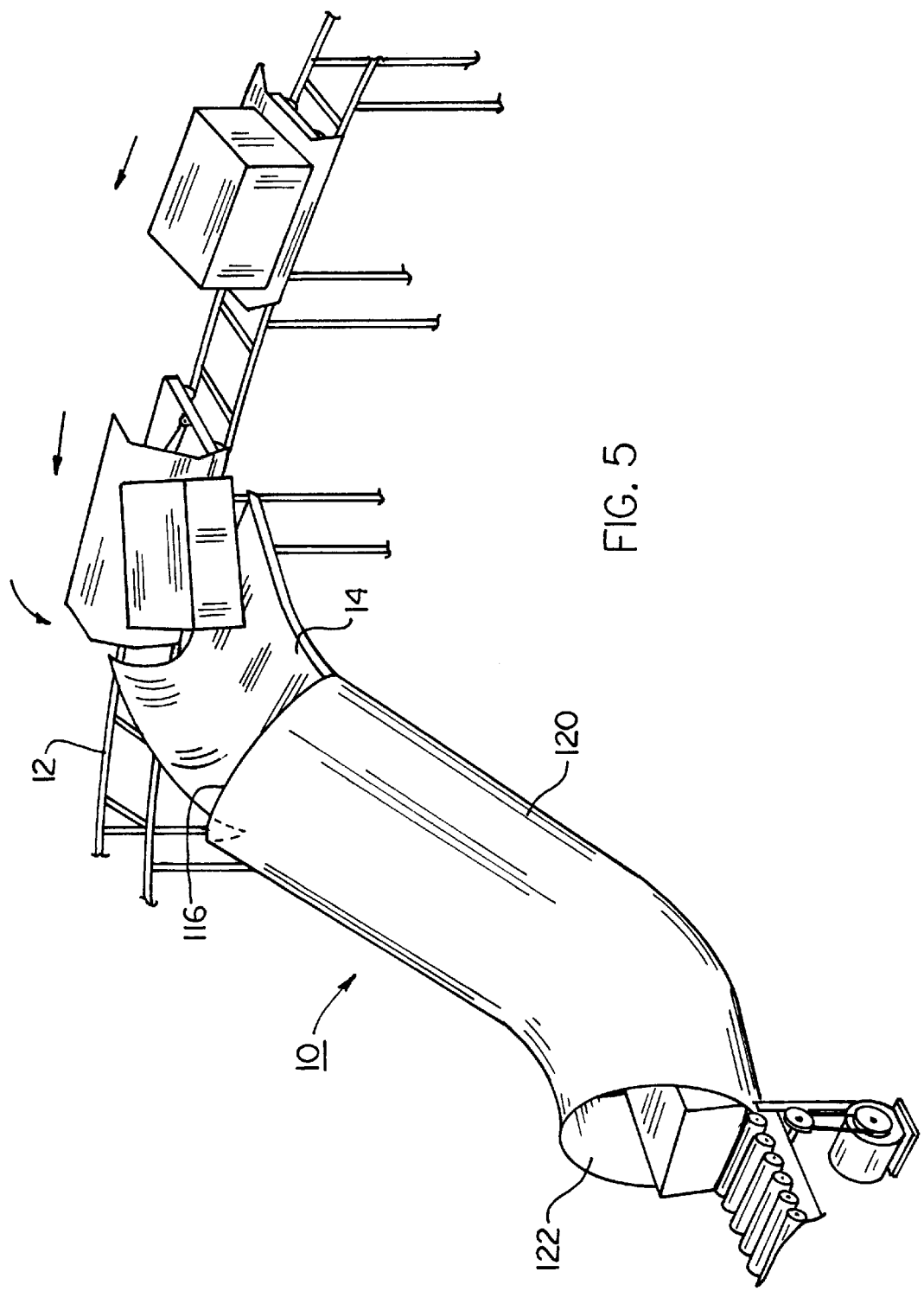
FIG. 5 is a side, elevational view of the tilt tray conveyors, transition zone funnel, and secondary downstream chute shown in FIG. 1.

FIG. 4A shows a top view of a train of carts of the package sorting conveyor in their un-tilted position. One affect of the two-axis tilting of the carrying tray 40 is that a side 44b of the tray that is tilted downwardly also rotates rearwardly relative to the cart 20, as shown in FIG. 4B by line 46a. Side 44d of the tray, which is tilted upwardly, rotates forwardly relative to the cart 20, as shown by line 46b. In the preferred embodiment in which the pivot axis 62 intersects the plain occupied by the tray 40 rear of center, the front side 44a of the tray 40 rotates a greater distance around the vertical axis 66, then the backside 44c of the tray 40, upon tilting of the tray 40.

As also shown in FIG. 4B, the bisecting center line of the tray 40 rotates further at its forward end from the horizontal line of travel 64, then at its rearward end. Thus, front side rotation line 48a follows a longer arch than backside rotation line 48b. By rearwardly rotating whichever side of the tray 40 is being tilted downwardly, some rearward velocity is imparted to package 11 as they are being discharged from the cart 20 of the invention into the transition zone funnel 14. Thus, package 11 is discharged at a lower velocity relative to the transition zone funnel 14 than the velocity of the train of conveyor carts as a whole. This enables the package 11 to be discharged into a narrower "chute" than could be accomplished using a conventional conveyor cart. Additionally, because the package is slowed down somewhat as it is discharged, there is less potential for damage to occur.

As can be seen in FIG. 2, the tray 40 may also include upwardly angles lateral "wings" 42 to help prevent package 11 from accidentally falling off the tray. These wings 42 also decrease the angle of the slope created when the tray 40 is tilted, which helps with gentle handling of the package 11 as it is discharged from the cart 20.

Figure 6:
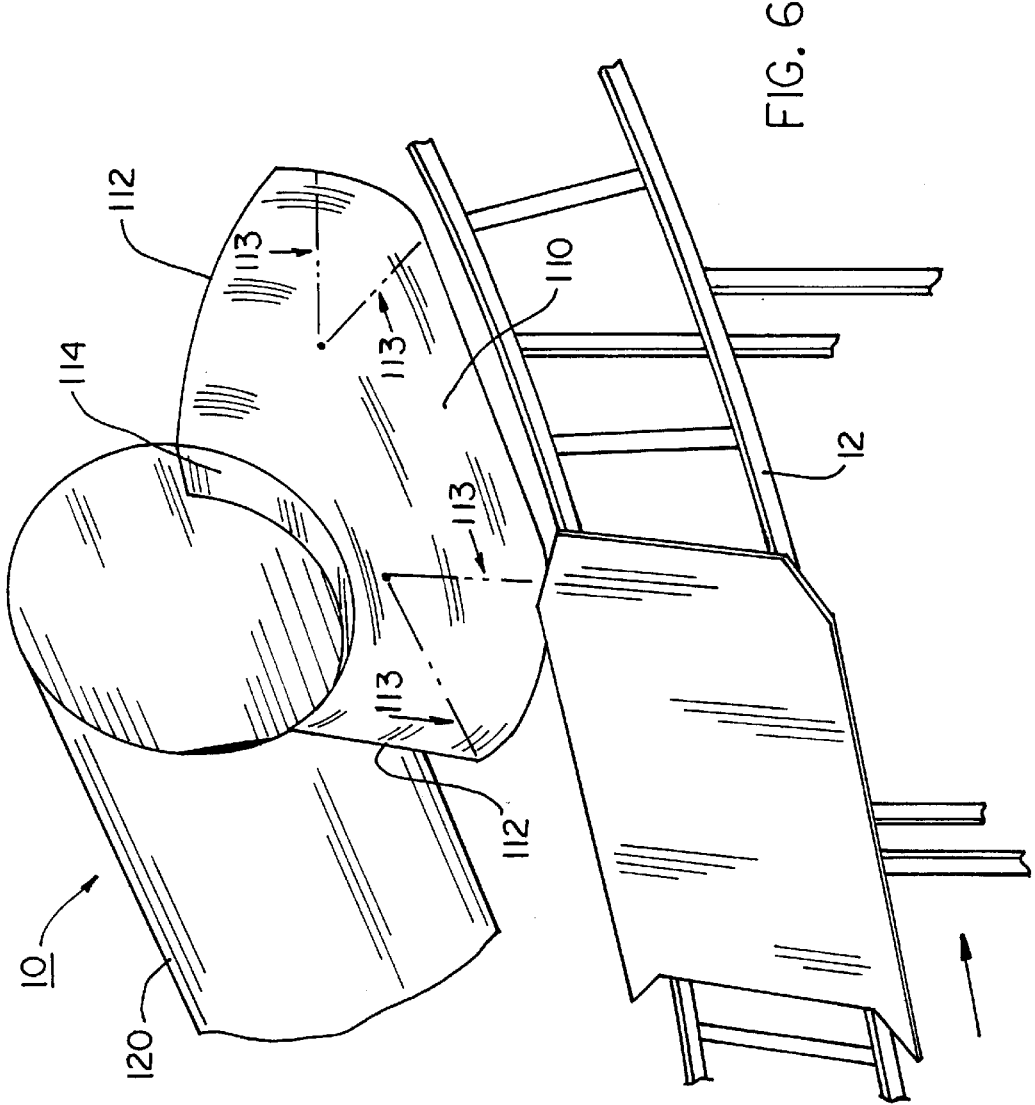
FIG. 6 is a top view of the transition zone funnel.

The transition zone funnel 14 is the area adjacent to the conveyor track that is used for unloading of package 11 from the cart 20 and funneling it away from the conveyor. The transition zone funnel is sized to allow complete removal of the package 11 from the cart 20. In the preferred embodiment, the transitional zone funnel includes an inlet 110, upwardly inclined downstream walls 112, and an outlet 114 as shown in FIG. 6. As the two-axis tiltable conveyor imparts a rearward component upon the package during unloading, the transition zone funnel of the present invention can be of a smaller size than the traditional unloading zone funnel and still provide sufficient room to receive the discharged package.

The inlet 110 is located adjacent to the conveyor track and receives packages as they are dispatched from the tilting tray. The inlet 110 is sized to be wider than the largest package to insure complete removal from the tilting tray onto the transitional zone funnel. The inlet is substantially flat to receive the package from the conveyor. The velocity imparted upon the package as it exits the tilting tray is such that the package will slide through the inlet as it continues moving away from the conveyor.

The substantially flat inlet helps to ensure the package does not roll as it exits the conveyor, but rather slides off the tilting tray and onto the inlet. This is especially critical for packages that are fragile to remain in the same orientation from the tilting tray to the inlet. The upward reaching wings 42 of the carrying tray also provide for a smooth transition from the carrying tray to the inlet. A smooth transition from the tray to the inlet is also important to ensure packages remain upon the transition zone funnel and do not roll and bounce off possibly injuring a person standing nearby or damaging the package.

The upwardly inclined downstream walls 112 further funnel the package 11 through the transition zone funnel. The upwardly inclined downstream walls serve the purpose of further reducing forward momentum of the package as they exit the tilt tray and conveyor. These downstream walls guide the package to the center of the transition zone funnel and away from the exterior edges to insure the package does not fall. These walls further act to rotate the package, for example, 90 degrees from its initial orientation upon the tilt tray. Altering the initial orientation is especially important for elongate packages such as rectangular boxes to allow the narrower edge to feed through the transition zone funnel and secondary downstream chute 16.

The radius of curvature 113 of the upwardly curved downstream wall is between about 2 to 6 feet. A preferred embodiment has a radius of curvature 113 of about 5 feet.

The outlet 114 of the transition zone funnel further funnels the package away from the conveyor and into the secondary downstream chute. The width of the outlet is larger than the package but smaller than the transitional zone funnel inlet acting to further funnel the package away from the conveyor. The outlet 114 connects the transition zone funnel to the secondary downstream conveyor.

The transition zone funnel 14 of the present invention is less wide than currently available conveyors. This is due to the two-axis system of the tilt tray conveyor imparting a rearward velocity upon the package as it is dispatched from the conveyor. As the package has reduced speed upon entering the transition zone funnel, less space is needed to further reduce the forward velocity and reorient the package through the transition zone funnel and into the secondary downstream chute.

Presently available conveyor systems result in a much larger forward velocity imparted to the package as they exit the conveyor requiring the need for a wider transition zone funnel. The present invention's smaller transition zone funnel allows for additional package dispatching stations and economized space. Additionally, the force of the conveyor system driving the package is partially transferred in a lateral direction of an adequate force to propel the package from the tilt conveyor through the transition zone funnel and into the secondary downstream chute. No additional movement force is needed to drive the packages through the system.

The secondary downstream chute 16 is positioned behind the transition zone funnel 14. The secondary downstream chute is comprised of a first section, central area, and a second section.

The inlet 116 is adjacent the outlet 114 of the transitional zone funnel and receives package after it has passed. The inlet is substantially the same width as the outlet and continues to further funnel the package 11 from the conveyor system.

The central area 120 further continues the movement of the package. The central area may be in a variety of orientations including substantially straight or may be curved at any angle to facilitate movement of the packages to a particular final destination. The variations in this central area are mainly dictated by available space and the location of a final dispatch. For example, the central area 120 may simply be straight to directly move package away from the conveyor. In another example, it may have a radius of curvature 126 and curve 180 degrees as shown in FIG. 7, resulting in the packages being placed on the opposite side of the conveyor track from which they are discharged.

The central area 120 may have a variety of shapes including "O-shaped" or "J-shaped" as shown in FIG. 8. The shape can vary depending upon the specific requirements. For example, an O-shaped central area provides additional support for taller package to further prevent tipping. The radius of the central area is sized such that the package may freely move through the area without becoming entangled or stuck. The radius of the central area should be between about 1.5 to 3 feet. A preferred embodiment has a radius of curvature of about 1.5 feet. The outlet of the secondary downstream chute is the end point of the conveyor system.

The secondary downstream chute 16 and transition zone funnel 14 preferably have a low friction, wear-resistant polymeric material surface. In a preferred embodiment, the polymeric material is a low density polyethylene. One source of such a low density polyethylene is Superior Plastics, Inc. of Carrolton, Ga. The use of low friction, wear-resistant polymeric material permits the chute to be used for a variety of weight of goods without the necessity of changing the angle of inclination.

Certain modifications and improvements will occur to those skilled in the art upon a reading of the foregoing description. By way of example, a portion of the chute could be replaced with a resilient material, such as nylon webbing, to act as a sound dampener when sorting goods in rigid plastic tote crates. The "give" of the webbing results in a significant reduction of the sound caused by the impact of the tote in the chute. It should be understood that all such modifications and improvements have been deleted herein for the sake of conciseness and readability but are properly within the scope of the following claims.

We claim:

1. A package sorting conveyor system having at least one conveyor cart movable along a continuous track and at least one unloading station, said conveyor system comprising:

(a) a two-axis tiltable support apparatus for supporting a carrying tray on said conveyor cart and for allowing tilting of said carrying tray towards at least one side of the package sorting conveyor system to unload a package into unloading stations on at least one side of the sorting conveyor, said tiltable support apparatus including: (i) an upper support structure joined to said carrying tray; (ii) a lower support structure mounted atop a frame structure of the conveyor cart; (iii) an angled pivot structure pivotally connecting said upper support structure to said lower support structure along a pivot axis, wherein the pivot axis is disposed at an angle to a line of travel of the sorting conveyor so as to impart a motion to the tilting of said carrying tray, said motion having a first axial component around a vertical axis of said carrying tray, said vertical axis being perpendicular to a line of travel of said two-axis tiltable support apparatus, and a second axial component along a horizontal axis, said horizontal axis being parallel to said line of travel of said carrying tray; and (b) a transition zone funnel upstream of said unloading station to receive said package from said conveyor cart, said transition zone funnel including: (i) an inlet adapted to receive said package from said conveyor cart; (ii) an upwardly inclined concave downstream wall for smoothly reducing the forward momentum of said package, said upwardly inclined concave downstream wall being located downstream of said inlet; and (iii) an outlet upstream of said unloading station.

2. The apparatus according to claim 1, further including a secondary downstream chute located downstream from said transition zone funnel for conveying the discharged package to its final destination, said secondary downstream chute including a first section, a central section, a second section.

3. The apparatus according to claim 2, wherein said secondary downstream chute is wider than said package.

4. The apparatus according to claim 2, wherein said secondary downstream chute further includes a central section that is substantially "O-shaped".

5. The apparatus according to claim 2, wherein said central section is substantially "J-shaped".

6. The apparatus according to claim 2, wherein said central section is substantially straight.

7. The apparatus according to claim 2, wherein said central section is curved.

8. The apparatus according to claim 7, wherein said central section is curved at an angle between about 90 and 360 degrees.

9. The apparatus according to claim 2, wherein the surface of said secondary downstream chute is a low friction, wear resistant polymeric material.

10. The apparatus according to claim 9, wherein said material is a high density polyethylene.

11. The apparatus according to claim 1, wherein tilting of said carrying tray includes tipping along a horizontal axis parallel to the line of travel of the sorting conveyor and rotating around a vertical axis perpendicular to the line of travel of the sorting conveyor.

12. The apparatus according to claim 11, wherein a side of said carrying tray tipped downwardly along the horizontal axis also rotates rearwardly around the vertical axis, and wherein a side of said carrying tray tipped upwardly along the horizontal axis also rotates forwardly around the vertical axis.

13. The apparatus according to claim 11, wherein a front side of said carrying tray rotates a greater distance around the vertical axis than a rear side of said carrying tray.

14. The apparatus according to claim 1, wherein said upper support structure comprises a front support member and a back support member.

15. The apparatus according to claim 14, wherein the pivot axis passes through lower regions of said front and back support members.

16. The apparatus according to claim 15, wherein said lower support structure generally lies is a vertical plane parallel to the line of travel of the sorting conveyor.

17. The apparatus according to claim 16, wherein said lower support structure includes an angled upper edge.

18. The apparatus according to claim 14, wherein said angled pivot structure comprises an axle that passes through said front support member, said lower support structure, and said back support member.

19. The apparatus according to claim 1, wherein said angled pivot structure comprises an axle, extending through said lower support structure, on which said upper support structure pivots.

20. The apparatus according to claim 1, wherein the pivot axis of said angled pivot structure lies in a vertical plane parallel to the line of travel of the sorting conveyor.

21. The apparatus according to claim 20, wherein said pivot axis angles downwardly in a forward direction.

22. The apparatus according to claim 21, wherein said pivot axis angles downwardly in a forward direction approximately 20 to 45 degrees below horizontal.

23. The apparatus according to claim 20, wherein said pivot axis intersects a plane occupied by said carrying tray rearward of a center of said carrying tray.

24. The apparatus according to claim 1, wherein said lower support structure is centrally mounted atop the frame structure.

25. A transition zone funnel for receiving a package discharged from a tiltable conveyor cart movable on a continuous track conveyor system at an unloading station, said transition zone funnel comprising:
   (a) an inlet adjacent to said continuous track conveyor system at said unloading station for receiving said package discharged from said tiltable conveyor cart;
   (b) an upwardly inclined concave downstream wall located downstream of said inlet for smoothly reducing forward momentum of said package; and
   (c) an outlet located downstream from said upwardly inclined downstream wall for discharging said package from said funnel.

26. The apparatus according to claim 25, wherein said inlet is substantially flat to receive a package being discharged from said conveyor cart.

27. The apparatus according to claim 26, wherein said inlet is wider than the front edge of said package enabling the package to slide off said conveyor cart onto said inlet.

28. The apparatus according to claim 25, wherein said upwardly inclined downstream wall has a radius of curvature between about 2 to 6 feet.

29. The apparatus according to claim 28, wherein said upwardly inclined downstream wall has a radius of curvature of about 5 feet.

30. The apparatus according to claim 25, wherein the forward direction of said package changes about 90° from its initial direction on said conveyor cart to its direction at the outlet of said funnel.

31. The apparatus according to claim 25, wherein the surface of said transition zone funnel is a low friction, wear resistant polymeric material.

32. The apparatus according to claim 31, wherein said material is a high density polyethylene.

33. A package sorting conveyor support system having at least one conveyor cart movable along a continuous track and at least one unloading station, said conveyor system comprising:
   (a) a two-axis tiltable support apparatus for supporting the carrying tray on said conveyor cart and for allowing tilting of said carrying tray towards at least one side of the package sorting conveyor system to unload a package into unloading stations on at least one side of the sorting conveyor, said tiltable support apparatus including: (i) an upper support structure joined to said carrying tray; (ii) a lower support structure mounted atop a frame structure pivotally connecting said upper support structure to said lower support structure along a pivot axis, wherein the pivot axis is disposed at an angle to a line of travel of the sorting conveyor so as to impart a motion to the tilting of said carrying tray, said motion having a first axial component around a vertical axis of said carrying tray, said vertical axis being perpendicular to said line of travel of said two-axis tiltable support apparatus, and a second axial component along a horizontal axis, said horizontal axis being parallel to said line of travel;
   (b) a transition zone funnel upstream of said unloading station to receive said package from said conveyor cart, said transition zone funnel including: (i) an inlet adjacent to said continuous track conveyor system at said unloading station for receiving said package discharged from said tiltable conveyor cart; (ii) an upwardly inclined concave downstream wall located downstream of said inlet for smoothly reducing forward momentum of said package; and (iii) an outlet located downstream from said upwardly inclined downstream wall for discharging said package from said funnel; and
   (c) a secondary downstream chute located downstream from said transition zone funnel for conveying the discharged package to its final destination, said secondary downstream chute including a first section, a central section, and a second section.

34. The apparatus according to claim 33, wherein said secondary downstream chute is wider than said package.

35. The apparatus according to claim 33, wherein said secondary downstream chute further includes a central section that is substantially "O-shaped".

36. The apparatus according to claim 33, wherein said central section is substantially "J-shaped".

37. The apparatus according to claim 33, wherein said central section is substantially straight.

38. The apparatus according to claim 23, wherein said central section is curved.

39. The apparatus according to claim 38, wherein said central section is curved at an angle between abut 90 and 360 degrees.

40. The apparatus according to claim 33, wherein the surface of said secondary downstream chute is a low friction, wear resistant polymeric material.

41. The apparatus according to claim 40, wherein said material is a high density polyethylene.

42. The apparatus according to claim 33, wherein tilting of said carrying tray includes tipping along a horizontal axis parallel to the line of travel of the sorting conveyor and rotating around a vertical axis perpendicular to the line of travel of the sorting conveyor.

43. The apparatus according to claim 42, wherein a side of said carrying tray tipped downwardly along the horizontal axis also rotates rearwardly around the vertical axis, and wherein a side of said carrying tray tipped upwardly along the horizontal axis also rotates forwardly around the vertical axis.

44. The apparatus according to claim 42, wherein a front side of said carrying tray rotates a greater distance around the vertical axis than a rear side of said carrying tray.

45. The apparatus according to claim 33, wherein said upper support structure comprises a front support member and a back support member.

46. The apparatus according to claim 45, wherein the pivot axis passes through lower regions of said front and back support members.

47. The apparatus according to claim 46, wherein said lower support structure generally lies is a vertical plane parallel to the line of travel of the sorting conveyor.

48. The apparatus according to claim 47, wherein said lower support structure includes an angled upper edge.

49. The apparatus according to claim 45, wherein said angled pivot structure comprises an axle that passes through said front support member, said lower support structure, and said back support member.

50. The apparatus according to claim 33, wherein said angled pivot structure comprises an axle, extending through said lower support structure, on which said upper support structure pivots.

51. The apparatus according to claim 33, wherein the pivot axis of said angled pivot structure lies in a vertical plane parallel to the line of travel of the sorting conveyor.

52. The apparatus according to claim 51, wherein said pivot axis angles downwardly in a forward direction.

53. The apparatus according to claim 52, wherein said pivot axis angles downwardly in a forward direction approximately 20 to 45 degrees below horizontal.

54. The apparatus according to claim 51, wherein said pivot axis intersects a plane occupied by said carrying tray rearward of a center of said carrying tray.

55. The apparatus according to claim 33, wherein said lower support structure is centrally mounted atop the frame structure.

56. The apparatus according to claim 33, wherein said inlet is substantially flat to receive a package being discharged from said conveyor cart.

57. The apparatus according to claim 56, wherein said inlet is wider than the front edge of said package enabling the package to slide off said conveyor cart onto said inlet.

58. The apparatus according to claim 33, wherein said upwardly inclined downstream wall has a radius of curvature between about 2 to 6 feet.

59. The apparatus according to claim 58, wherein said upwardly inclined downstream wall has a radius of curvature of about 5 feet.

60. The apparatus according to claim 33, wherein the forward direction of said package changes about 90° from its initial direction on said conveyor cart to its direction at the outlet of said funnel.

61. The apparatus according to claim 33, wherein the surface of said transition zone funnel is a low friction, wear resistant polymeric material.

62. The apparatus according to claim 61, wherein said material is a high density polyethylene.

* * * * *